United States Patent
Li et al.

(10) Patent No.: US 10,355,577 B2
(45) Date of Patent: Jul. 16, 2019

(54) CONTROL CIRCUIT AND CONTROL METHOD OF SWITCHING POWER SUPPLY

(71) Applicant: Wuxi Chipown Micro-electronics Limited, Wuxi, Jiangsu (CN)

(72) Inventors: Haisong Li, Jiangsu (CN); Changshen Zhao, Jiangsu (CN); Wenliang Liu, Jiangsu (CN); Yangbo Yi, Jiangsu (CN); Biao Zhou, Jiangsu (CN); Tao Zhang, Jiangsu (CN); Huazheng Rui, Jiangsu (CN)

(73) Assignee: Wuxi Chipown Micro-Electronics Limited (CN)

( * ) Notice: Subject to any disclaimer, the term of this patent is extended or adjusted under 35 U.S.C. 154(b) by 90 days.

(21) Appl. No.: 15/667,796

(22) Filed: Aug. 3, 2017

(65) Prior Publication Data
US 2018/0287479 A1    Oct. 4, 2018

(30) Foreign Application Priority Data
Mar. 28, 2017  (CN) .......................... 2017 1 0191750

(51) Int. Cl.
*H02M 1/08*    (2006.01)
*H02M 3/335*   (2006.01)
*H02M 1/00*    (2006.01)

(52) U.S. Cl.
CPC ......... *H02M 1/08* (2013.01); *H02M 3/33507* (2013.01); *H02M 3/33523* (2013.01); *H02M 2001/0003* (2013.01)

(58) Field of Classification Search
None
See application file for complete search history.

(56) References Cited

U.S. PATENT DOCUMENTS 7,239,532 B1 *   7/2007   Hsu ................... H02M 3/33523
                                              363/21.12

* cited by examiner

*Primary Examiner* — Jue Zhang
*Assistant Examiner* — Henry E Lee, III
(74) *Attorney, Agent, or Firm* — Colin P. Cahoon; Shaukat A. Karjeker; Carstens & Cahoon, LLP

(57) ABSTRACT

A control circuit and a control method of a switching power supply, according to feedback signals on a pin FB and a pin CS, a constant current control module generates and outputs a control signal to control an output current of the switching power supply, thereby regulating duty cycle of a first transistor adaptively and controlling an output current Io of a power supply system to be constant; according to the feedback signals on the pin FB and on the pin CS, a constant current precision compensation module adaptively regulates circuit parameters of the constant current control module and a sample-and-hold module, preventing precision of constant current output from being influenced by change of a working mode and/or by variation of input conditions; when an output voltage changes, QR mode keeps unchanged or depth of a CCM keeps approximately constant.

10 Claims, 6 Drawing Sheets

CONTROL CIRCUIT AND CONTROL METHOD OF SWITCHING POWER SUPPLY

CROSS REFERENCE TO RELATED APPLICATIONS

This application claims the benefit of the priority of Chinese Patent Application No. 201710191750.5, filed on Mar. 28, 2017, entitled "Control Circuit and Control Method of Switching Power Supply", the entire contents of which are incorporated herein by reference.

TECHNICAL FIELD

The present disclosure relates to improvements on a control circuit and a control method of a switching power supply, is applied in power management integrated circuit systems, and belongs to the technical field of power semiconductor.

BACKGROUND OF THE INVENTION

The output current of the flyback switching power supply is denoted as:

$$I_O = \frac{N_P}{N_S} \times \frac{I_{PRI\_PK} + I_{PRI\_O}}{2} \times \frac{T_D}{T_P},$$

wherein, $$\frac{N_P}{N_S}$$

is the turns ratio of the primary side to the secondary side; $I_{PRI\_PK}$ is the current peak value of the primary side during magnetization of the transformer; $I_{PRI\_O}$ is the initial current value of the primary side during magnetization of the transformer; $T_D$ is the demagnetization time of the transformer; $T_P$ is the single switching period of the flyback switching power supply. The expression above can also be denoted as:

$$I_O = \frac{N_P}{N_S} \times \frac{V_{CS\_PK} + V_{CS\_O}}{2R_{CS}} \times \frac{T_D}{T_P},$$

wherein, $R_{CS}$ is the resistance of the current sensing resistor at the primary side; $V_{CS\_PK}$ is the voltage peak value across the resistor $R_{CS}$ during magnetization of the transformer; $V_{CS\_O}$ is the initial voltage value across this resistor $R_{CS}$ during magnetization of the transformer. When the flyback switching power supply works in a Discontinuous Conduction Mode (DCM), as $V_{CS\_O}$ equals to zero, the output current can be simplified as $$I_O = \frac{N_P}{N_S} \times \frac{V_{CS\_PK}}{2R_{CS}} \times \frac{T_D}{T_P}.$$

The traditional constant current control method is based on the simplified expression: determine the turns ratio $$\frac{N_P}{N_S}$$

of the primary side to the secondary side and the resistance $R_{CS}$ of the current sensing resistor at the primary side; keep $V_{CS\_PK}$ constant in each switching period; then regulate the ratio of the switching period $T_P$ to the demagnetization time $T_D$ of the transformer to be constant K, thereby controlling the output current $$I_O = \frac{N_P}{N_S} \times \frac{V_{CS\_PK}}{2R_{CS}} \times \frac{1}{K}$$

to be constant and realizing control of constant current output.

One of the obvious defects of the traditional constant current output control method above is that, when the flyback switching power supply works in a Continuous Conduction Mode (CCM), namely, when $V_{CS\_O}$ is not equal to zero, the constant current control method becomes invalid. What's more, even when the flyback switching power supply works in the DCM, the constant current control method requires the ratio of $T_P$ to $T_D$ strictly constant, which is not compatible with the valley switching (QR) mode in the DCM. Therefore, the power supply adopting the constant current output control method above has the defect of low efficiency; what's more, the design of the transformer is restricted in order to ensure the power supply not to work in the CCM.

As shown in FIG. 1, the circuit system includes a transformer T1, a diode D1, a capacitor $C_O$, a resistor $R_{FB1}$, a resistor $R_{FB2}$, a resistor $R_{CS}$ and a control circuit. The connection relationship is that: an auxiliary side $N_a$ of the transformer T1 is electrically connected with a first end of the resistor $R_{FB1}$; a second end of the resistor $R_{FB1}$ is electrically connected with a first end of the resistor $R_{FB2}$ and a pin FB of the control circuit; a second end of the resistor $R_{FB2}$ is electrically connected with a power ground; a primary side Np of the transformer T1 is electrically connected with a pin SW of the control circuit; a secondary side Ns of the transformer T1 is electrically connected with the positive electrode of the diode D1; the negative electrode of the diode D1 is electrically connected with the output capacitor $C_O$; a first end of the resistor Rcs is electrically connected with a pin CS of the control circuit; a second end of the resistor Rcs is electrically connected with a power ground; a first end of the capacitor Cp is electrically connected with a pin COMP of the control circuit; a second end of the capacitor Cp is electrically connected with the power ground. The control circuit includes a first comparator 1, a RS flip-latch G1, a first voltage controlled current source 5, a current supply $I_{REF}$, a second voltage controlled current source 7, a current supply $I_{MID}$, a switch 5, a midpoint sampling unit 6, a second comparator 2, a clock generator 4, a RS flip-latch G2, a driving module 3 and a first transistor M1. A positive end of the first comparator 1 is electrically connected with the pin FB; a negative end of the first comparator 1 is electrically connected with a reference voltage $V_{TH}$; an output end of the first comparator 1 is electrically connected with an input end R of the RS flip-latch G1; an output end Q of the RS flip-latch G1 is electrically connected with a control end of the switch S; a first end of the switch S is electrically connected with the current source $I_{REF}$ and a negative end of the second comparator 2; a control end of the current source $I_{REF}$ is electrically connected with an output end of the first voltage controlled current source 5; an input end of the first voltage controlled current source 5 is electrically connected with the reference voltage $V_{REF}$; a second end of the switch S is electrically connected with the current supply $I_{MID}$; a control end of the current supply $I_{MID}$ is electrically connected with an output end of the second voltage controlled current source 7; an input end of the second voltage controlled current source 7 is electrically connected with an output end of the midpoint sampling unit 6; an input end of the midpoint sampling unit 6 is electrically connected with the pin CS, a source terminal of the first transistor M1, and a positive end of the second comparator 2; an output end of the second comparator 2 is electrically connected with an input end R of the RS flip-latch G2; an input end S of the RS flip-latch G2 is electrically connected with an output end of the clock generator 4; an output end of the RS flip-latch G2 is electrically connected with an input end of the driving module 3; a drain terminal of the first transistor M1 is electrically connected with the pin SW. The working principle is as follows: the midpoint sampling unit 6 detects the voltage $V_{CS\_MID}$ at the pin CS at the midpoint of the conduction period of the first transistor M1; the voltage controlled current source generates the current $I_{MID}$, and $I_{MID}=K_G \times V_{CS\_MID}$, wherein, $K_G$ is an internal design parameter of the control circuit; what's more, the first comparator 1 compares the voltage $V_{FB}$ at the pin FB with the reference voltage $V_{TH}$, thereby obtaining the demagnetization time $T_D$ in each switching period of the transformer. During non demagnetization period, the reference current $I_{REF}$ charges the capacitor $C_p$, while during demagnetization period, the current $I_{REF}-I_{MID}$ charges the capacitor $C_p$, and the voltage of the capacitor $C_p$ is accumulated gradually one cycle by one cycle till to be a stable and finite value $V_C$. At this instant, the value $I_{REF} \times T_P - I_{MID} \times T_D$ converges to be zero, namely, $I_{REF} \times T_P = K_G \times V_{CS\_MID} \times T_D$. According to the expression of the output current of the flyback switching power supply, the output current can be expressed as $$I_O = \frac{N_P}{N_S} \times \frac{I_{REF}}{R_{CS} * K_G},$$

wherein, $$\frac{N_P}{N_S}$$

is the turns ratio of the primary side to the secondary side, $R_{CS}$ is the resistance of the current sensing resistor at the primary side. As for the switching power supply whose $$\frac{N_P}{N_S}$$

and $R_{CS}$ are determined, the output current Io is constant.

The CCM is compatible with the QR mode in the working manner above, but the required capacitance of the capacitor COM is larger, and it is difficult to integrate the capacitor into the control circuit, which increases the design cost of the control circuit and the power supply system.

Further, in the constant current output control method, through comparing the voltage $V_{FB}$ at the pin FB with the reference voltage $V_{TH}$, the demagnetization time $T_D$ of the transformer is detected. FIG. 2a illustrates the waveforms in the working mode of DCM, wherein, at the end time of the demagnetization, the transformer enter the resonating section, so the falling slope of $V_{FB}$ is relatively slower, and the demagnetization time $T_D$ detected actually includes half of a resonant period. FIG. 2b illustrates the waveforms in the working mode of CCM, wherein, the current of the diode output at the secondary side is not de-excited to be zero, so there is no resonant period, and the falling slope of $V_{FB}$ is relatively faster, and the demagnetization time $T_D$ detected is approximately equal to the real demagnetization time. The difference between the detected demagnetization time and the real demagnetization time in the CCM is different from the difference between the detected demagnetization time and the real demagnetization time in the DCM, therefore, the current output in the CCM is different from the current output in the DCM.

Further, in the constant current output control method, in order to detect $V_{CS\_MID}$, a sample signal is generated through the conduction time TON of the first transistor M1. The first transistor M1 has an off delay $T_{delay}$, therefore, there is a difference between the detected $V_{CS\_MID}$ and the real $V_{CS\_MID}$. FIG. 3a illustrates the working waveforms when the input voltage is relatively higher, wherein, as the voltage $V_{CS}$ at the pin CS has a lager rising slope, the difference is lager. FIG. 3b illustrates the working waveforms when the input voltage is relatively lower, wherein, as the voltage $V_{CS}$ at the pin CS has a smaller rising slope, the difference is smaller. Thereby, the output current is different when the input voltage is different.

In conclusion, the working mode above not only increases the design cost of the control circuit and the power supply system, but also has the defects of lager difference of output current between different working modes, low input voltage regulation and low precision of constant current. Therefore, in order to overcome the defects, it is urgent to provide a constant current output control method compatible with the CCM and the QR mode.

SUMMARY OF THE INVENTION

In order to overcome the defects in the prior art, the present disclosure provides a control circuit and control method of switching power supply, which are compatible with the CCM and the QR working modes, which don't increase the cost of the power supply system, and which have constant current output with high precision.

The control circuit of switching power supply comprises a first comparator, a first RS flip-latch, a constant current control module, a constant current precision compensation module, a sample-and-hold module, a low pass filter, a second comparator, a second RS flip-latch, a voltage controlled oscillator, a timer, an AND Gate, a driving module and a first transistor; wherein, a first input end of the constant current control module is electrically connected with an output end Q of the first RS flip-latch and a first input end of the constant current precision compensation module respectively; a second input end of the constant current control module is electrically connected with a pin FB and a positive end of the first comparator respectively; a third input end of the constant current control module is electrically connected with an output end of the driving module, an input end S of the first RS flip-latch, a gate terminal of the first transistor, and a second input end of the constant current precision compensation module; a fourth input end of the constant current control module is electrically connected with a first output end of the constant current precision compensation module; a fifth input end of the constant current control module is electrically connected with an output end of the sample-and-hold module; an output end of the constant current control module is electrically connected with an input end of the low pass filter; an input end of the sample-and-hold module is electrically connected with a pin CS, a positive end of the second comparator, and a source terminal of the first transistor respectively; a control end of the sample-and-hold module is electrically connected with a second output end of the constant current precision compensation module; an output end of the low pass filter is electrically connected with an input end of the voltage controlled oscillator and a negative end of the second comparator; an output end of the voltage controlled oscillator is electrically connected with a first input end of the AND Gate; an output end of the timer is electrically connected with a second input end of the AND Gate; an input end of the timer is electrically connected with an input end R of the first RS flip-latch and an output end of the first comparator; an output end of the AND gate is electrically connected with an input end S of the second RS flip-latch; an output end of the second comparator is electrically connected with an input end R of the second RS flip-latch; an output end of the second RS flip-latch is electrically connected with an input end of the driving module.

Further, the sample-and-hold module comprises a first current mirror unit, a second current mirror unit, a first switch, a second switch, a third switch, a fourth switch, a second transistor, a first capacitor, a first resistor, a first operational amplifier, and a first inverter; a control end of the first switch and a control end of the third switch are controlled by an output signal from the second output end of the constant current precision compensation module; a control end of the first operational amplifier, a control end of the first switch and the control end of the third switch are electrically connected with a same signal; a control end of the second switch and a control end of the fourth switch are electrically connected with a first signal, which is opposite to a second signal electrically connected with the control end of the first switch and the control end of the third switch; a positive input end of the first operational amplifier is electrically connected with a first end of the first switch and the first capacitor; a negative input end of the first operational amplifier is electrically connected with a first end of the third switch and a first end of the fourth switch; an output end of the first operational amplifier is electrically connected with an output end of the first current mirror unit and a first end of the second switch; a second end of the first switch is electrically connected with an input end of the first current mirror unit; a second end of the second switch is electrically connected with a gate terminal of the second transistor; a second end of the third switch is electrically connected with the pin CS; a second end of the fourth switch is electrically connected with the first resistor and a source terminal of the second transistor; a drain terminal of the second transistor is electrically connected with an input end of the second current mirror unit; an output of the second current mirror unit is electrically connected with the fifth input end of the constant current control module.

Further, the constant current control module comprises a first constant current source, a second constant current source, a current source, a fifth switch, a sixth switch, a seventh switch, an eighth switch, a switch, a second capacitor, a third capacitor, a fourth capacitor, a second resistor, a third transistor, a second operational amplifier, a third comparator, a third RS flip-latch, a one-of-two data selector, a first D flip-flop and an error amplifier EA; an output end of the error amplifier is the output end of the constant current control module; a positive end of the error amplifier is electrically connected with a reference voltage $V_{REF2}$, a negative end of the error amplifier is electrically connected with an output end of the one-of-two data selector; an input end IN1 of the one-of-two data selector is electrically connected with a first end of the eighth switch and the fourth capacitor; an input end IN2 of the one-of-two data selector is electrically connected with a positive end of third comparator and a reference voltage $V_{REF1}$; a selecting end SEL of the one-of-two data selector is electrically connected with an output end of the third comparator; a negative end of the third comparator is electrically connected with the pin FB; a second end of the eighth switch is electrically connected with an output end of the sample-and-hold module; a control end of the eighth switch is electrically connected with a control end of the seventh switch and an output end Q of the third RS flip-latch; an input end R of the third RS flip-latch is electrically connected with a control end of the fifth switch and an output end Q of the first D flip-flop; an input end S of the third RS flip-latch is electrically connected with a first end of the sixth switch, a first end of the seventh switch and the third capacitor; a second end of the sixth switch is electrically connected with the second constant current source; a control end of the sixth switch is electrically connected with an output end of the first comparator; a second end of the seventh switch is electrically connected with an output end of the fourth current mirror unit; an input end of the fourth current mirror unit is electrically connected with an output end of the third current mirror unit; a first input end of the third current mirror unit is electrically connected with a drain terminal of the third transistor and a first end of the switch $S_N$; a second input end of the third current mirror unit is electrically connected with a second end of the switch $S_N$; the switch $S_N$ is controlled by a signal at a first output end of the constant current precision compensation module; a source terminal of the third transistor is electrically connected with the second resistor and an input end of the second operational amplifier; a gate terminal of the third transistor is electrically connected with an output end of the second operational amplifier; a positive input end of the second operational amplifier is electrically connected with a first end of the fifth switch and the second capacitor; a second end of the fifth switch is electrically connected with the first constant current source.

Further, the constant current precision compensation module comprises a second D flip-flop, a fourth RS flip-latch, a third constant current source, a fourth constant current source, a fifth constant current source, a ninth switch, a tenth switch, an eleventh switch, a fifth capacitor and a sixth capacitor; an input end D of the second D flip-flop is electrically connected with the output end of the first comparator; an output end Q of the second D flip-flop is electrically connected with the constant current control module; an input end CK of the second D flip-flop is electrically connected with a control end of the eleventh switch, an input end R of the fourth RS flip-latch and the output end of the driving module; a control end of the ninth switch is electrically connected with a first end of the eleventh switch, the fifth constant current source, and a first end of the sixth capacitor; a first end of the ninth switch is electrically connected with the third constant current source; a second end of the ninth switch is electrically connected with a first end of the tenth switch, an input end S of the fourth RS flip-latch and a first end of the fifth capacitor; a second end of the tenth switch is electrically connected with the fourth constant current source; an output end Q of the fourth RS flip-latch is electrically connected with the sample-and-hold module; a second end of the eleventh switch, a second end of the fifth capacitor and a second end of the sixth capacitor are electrically connected with the power ground.

Further, the constant current precision compensation module comprises a second D flip-flop, a fourth RS flip-latch, a timer, a third constant current source, a fourth constant current source, a ninth switch, a tenth switch, a switch $S_M$, a fifth capacitor and a sixth capacitor; an input end D of the second D flip-flop is electrically connected with the output end of the first comparator; an input end CK of the second D flip-flop is electrically connected with a control end of the ninth switch, an input end R of the fourth RS flip-latch, an input end of the timer and the output end of the driving module; an output end Q of the second D flip-flop is electrically connected with the constant current control module; a first end of the ninth switch is electrically connected with the third constant current source; a second end of the ninth switch is electrically connected with a first end of the tenth switch, the fifth capacitor, and an input end S of the fourth RS flip-latch; a second end of the tenth switch is electrically connected with the fourth constant current source and a first end of the switch; a second end of the switch $S_M$ is electrically connected with the current source $I_M$; an input end of the switch $S_M$ is electrically connected with an output end of the timer.

The present disclosure further provides a control method of a switching power supply, said control method is implemented with the control circuit defined above; wherein, according to the feedback signals on the pin FB and the pin CS, the constant current control module generates and outputs a control signal to control an output current of the switching power supply, thereby regulating the duty cycle of the first transistor adaptively and controlling an output current Io of the power supply system to be constant; according to the feedback signals on the pin FB and on the pin CS, the constant current precision compensation module adaptively regulates circuit parameters of the constant current control module and the sample-and-hold module, preventing a precision of the constant current output from being influenced by change of a working mode and/or by variation of input conditions; a timer is configured to judge to determine the time instant when voltage $V_{FB}$ on the pin FB reaches the voltage valley; according to a control signal output by the constant current control module and a signal output by the timer, the voltage controlled oscillator regulates the switching frequency of the first transistor, making the switching power supply work in a QR mode or in a CCM, and when an output voltage changes, the QR mode keeps unchanged or depth of the CCM keeps approximately constant.

Further, the sample-and-hold module comprises a first current mirror unit, a second current mirror unit, a first switch, a second switch, a third switch, a fourth switch, a second transistor, a first capacitor, a first resistor, a first operational amplifier, and a first inverter; when the first switch and the third switch are closed, the first operational amplifier works in a transconductance mode, namely, an output current $I_{C1}$ from the first current mirror unit charges the first capacitor; $I_{C1}$ is expressed as follows: $I_{C1}=K1\times(V_{C1}-V_{CS})\times G_M$, wherein, $V_{C1}$ is voltage of the first capacitor; $V_{CS}$ is the voltage on the pin CS of the control circuit; $G_M$ is the transconductance of the first operational amplifier when it works in the transconductance mode; $V_{C1}$ is expressed as follows:

$$V_{C1} = V_{CS} - \frac{C\frac{dV_{C1}}{dt}}{G_M \times K1};$$

when $C/G_M$ approaches zero, $V_{C1}=V_{CS}$ is obtained; when the first switch and the third switch are opened, the second switch and the fourth switch are closed, and the first operational amplifier works in a following mode; the voltage $V_{C1}$ of the first capacitor is transmitted to a source terminal of the second transistor, convened to a current $I_{MID}$ through the first resistor, mirrored and output to the fifth input end of the constant current control module.

Further, the constant current control module comprises a first constant current source, a second constant current source, a current source $I_M$, a fifth switch, a sixth switch, a seventh switch, an eighth switch, a switch $S_N$, a second capacitor, a third capacitor, a fourth capacitor, a second resistor, a third transistor, a second operational amplifier, a third comparator, a third RS flip-latch, a one-of-two data selector, a first D flip-flop and the error amplifier; a first D flip-flop is connected to form a divide-by-two circuit, which generates a period-by-period switching frequency signal $T_P$; a fifth switch is controlled by a signal $T_P$; when the fifth switch is closed, the first constant current source charges the second capacitor; the charged voltage generates current through the second operational amplifier and the second resistor; the current generated is mirrored and output to a fourth current mirror unit; a ratio of an input current to an output current of a third current mirror unit is $(K_{REF}+K_D):1$, wherein, $K_{REF}$ and $K_D$ are constants, and value of $K_D$ is controlled by a state of the switch $S_N$; a ratio of an input current to the output current of the fourth current mirror unit is 1:1; the sixth switch is controlled by the signal $T_P$; when the sixth switch is closed, the second constant current source charges the third capacitor and the charged voltage is held after being charged; the seventh switch is controlled by an output end Q of the third RS flip-latch; it is a high voltage level at a start of the signal $T_P$, namely, when a switching period starts, the output current of the fourth current mirror unit discharges the third capacitor; when the voltage of the third capacitor reaches an inverting threshold of the third RS flip-latch, the signal at the output end Q of the third RS flip-latch inverts to be a low level, and the discharging process is terminated and a time signal $T_{CC}$ is generated; the eighth switch is controlled by a time signal $T_{CC}$; when the eighth switch is closed, a current $I_{MID}$ charges the fourth capacitor, and a voltage $V_{C4}$ is transmitted to an input end IN1 of the one-of-two data selector; the voltage $V_{C4}$ of the fourth capacitor is expressed as follows:

$$V_{C4} = V_{CS\_MID} \times (K_{REF} + K_D) \times \frac{T_D}{T_P};$$

the input end IN2 of the one-of-two data selector is electrically connected with a reference voltage $V_{REF1}$, and a voltage $V_{REF1}$ is generated by an internal circuit of the control circuit; the one-of-two data selector selects an input data at the input end IN1 or an input data at the input end IN2 as an output data at a selecting end SEL, a potential of the selecting end SEL is controlled by an output signal of the third comparator; when the voltage $V_{FB}$ at the pin FB is less than $V_{REF1}$, the selecting end SEL of the one-of-two data selector selects the input data at the input end IN2 and outputs it to a negative end of the error amplifier, and a positive end of the error amplifier is electrically connected with the reference voltage $V_{REF2}$, wherein, $V_{REF2} > V_{REF1}$; at this time, the error amplifier outputs a high voltage; a period-by-period current peak value at a primary side of a transformer increases rapidly; energy transmitted to an output stage of the power supply increases rapidly, and the switching power supply starts rapidly; when the voltage VFW at the pin FB is larger than $V_{REF1}$, the selecting end SEL of the one-of-two data selector selects the input data at the input end IN1, the voltage $V_{C4}$ of the fourth capacitor is output to the negative end of the error amplifier; when the working state is in an equilibrium state, $$V_{CS\_MID} \times (K_{REF} + K_D) \times \frac{T_D}{T_P} = V_{C4} = V_{REF2};$$

an output current Io is expressed as follows:

$$I_O = \frac{N_P}{N_S} \times \frac{V_{CS\_MID}}{R_{CS}} \times \frac{T_D}{T_P} = \frac{N_P}{N_S} \times \frac{1}{R_{CS}} \times \frac{V_{REF2}}{K_{REF} + K_D},$$

wherein, $$\frac{N_P}{N_S}$$

is a turns ratio of the primary side to a secondary side, $R_{CS}$ is a resistance of a current sensing resistor at the primary side; as for the switching power supply whose $$\frac{N_P}{N_S}$$

and $R_{CS}$ are determined, the output current Io is a constant.

Further, current values of the first constant current source and the second constant current source are equal; capacitance values of the second capacitor, the third capacitor and the fourth capacitor are equal.

Further, a constant current precision compensation module comprises a second D flip-flop, a fourth RS flip-latch, a third constant current source, a fourth constant current source, a fifth constant current source, a ninth switch, a tenth switch, an eleventh switch, a fifth capacitor and a sixth capacitor; at a start time instant when the first transistor is on, the second D flip-flop detects whether the voltage $V_{FB}$ at the pin FB is lower than a voltage threshold $V_{TH}$, namely, whether a demagnetization of the transformer is finished; if yes a mode compensation signal COMP is output to the constant current control module, thereby regulating a scaling parameter $K_D$, and differences of output currents between different working modes are compensated; a delay circuit for falling edge comprising the fifth constant current source, the eleventh switch and the sixth capacitor is configured to calculate and adjust the time point of the sampling instants of voltage $V_{CS}$, based on adjusting the pulse width used, thereby regulating a distance between sampling instant of the voltage $V_{CS}$ and a midpoint of a real conduction period of the first transistor, and compensating differences of output currents under different input voltages.

As compared with the prior art, the technical schemes of the present disclosure have prominent substantive features and represent notable progresses as follows:

1. The switching power supply of the present disclosure outputs constant current in the continuous working mode and/or in the quasi-resonant working mode, without increasing the quantity of the pins of the control circuit and the elements of the power system, nor the design cost thereof. The present disclosure regulates the scaling parameters of the constant current control circuit through detecting the working mode and/or the resonant period, so as to compensate the difference of the constant currents output between different working modes; and regulates the sampling point of the current at the primary side through detecting the off delay of the power switch and the static error of the current sampled at the primary side, so as to compensate the difference of the constant currents output under different input voltages. Additionally, at the initial stage of starting, the detection results to the primary side information is shielded, and separated starting parameters are set, thereby charging the output capacitor more rapidly, establishing the output voltage more quickly and starting the switching power supply more quickly. Through control and compensation, the precision of the constant current output of the switching power supply is enhanced and the switching power supply is started-up more quickly.

2. Through detecting the working mode and/or the resonant cycle, the present disclosure regulates the scaling parameters of the constant current control circuit, so as to compensate the difference of the constant currents output between different working modes; through detecting the off delay of the power switch and the static error of the sampled current at the primary side, the present disclosure regulates the sampling point of the current at the primary side, so as to compensate the difference of the constant currents output under different input voltages; the constant current output of the present disclosure has a higher precision.

3. At the initial stage of starting, the control circuit of the switching power supply of the present disclosure shields the detection results to the primary side information, sets separated starting parameters, thereby charging the output capacitor more rapidly, establishing the output voltage more quickly and enhancing the starting speed, especially, enhancing the starting speed of capacitive loads.

4. Based on the $V_{FB}$ value, the control circuit of the switching power supply of the present disclosure regulates the switching frequency accordingly, namely, the switching frequency is regulated according to the loads when the switching power outputs constant current, so as to ensure that the switching power supply works in the quasi-resonant mode and/or in the continuous working mode. What's more, the depth of the continuous working mode doesn't change along with the change of the loads, thereby ensuring that the switch has a high transfer efficiency and has no risk of saturation and being damaged.

5. The present disclosure realizes a constant current output in the continuous working mode and/or in the quasi-resonant working mode, without increasing the quantity of the pins of the control circuit and the elements of the power system, nor increasing the design cost thereof; the present disclosure can support CCM and QR working modes without increasing the cost of the power system, and the precision of the constant current output is higher.

DETAILED DESCRIPTION OF THE PREFERRED EMBODIMENTS

For a better understanding of the technical features, the objective and the technical effect of the present disclosure, embodiments of the technical scheme of the present invention will be described in more details with reference to the accompanying figures.

Figure 1:
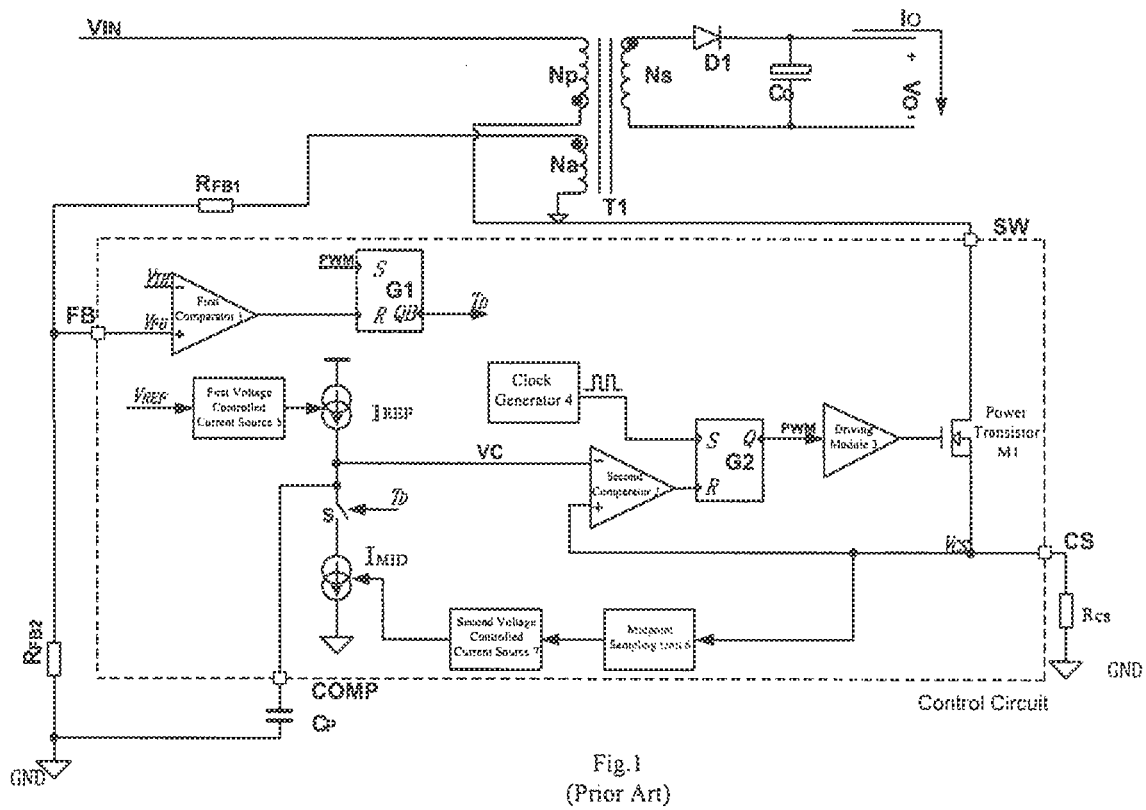
FIG. 1 is a principle schematic diagram of a control circuit and the power supply system of the switching power supply in the prior art.
Figure 2A:
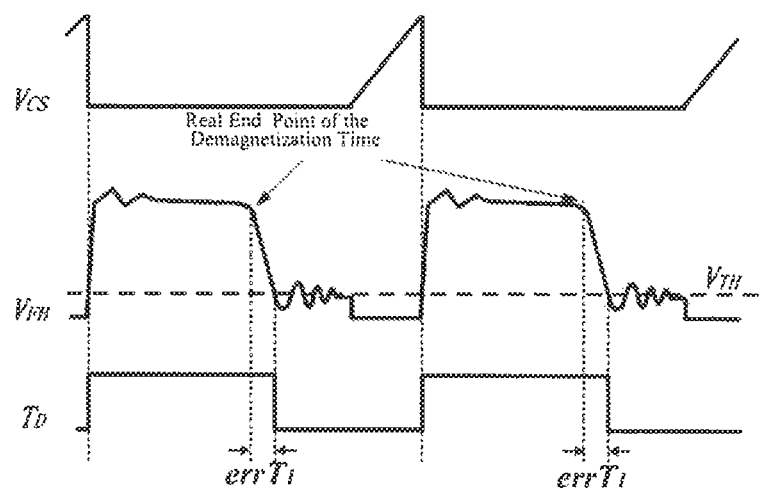
FIG. 2a shows waveforms illustrating the deviation of the detected demagnetization time in the DCM.
Figure 2B:
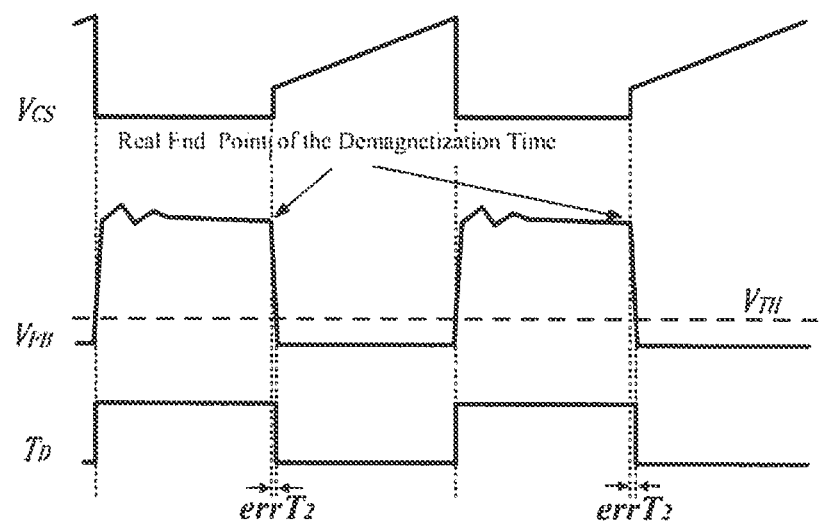
FIG. 2b shows waveforms illustrating the deviation of the detected demagnetization time in the CCM.
Figure 3A:
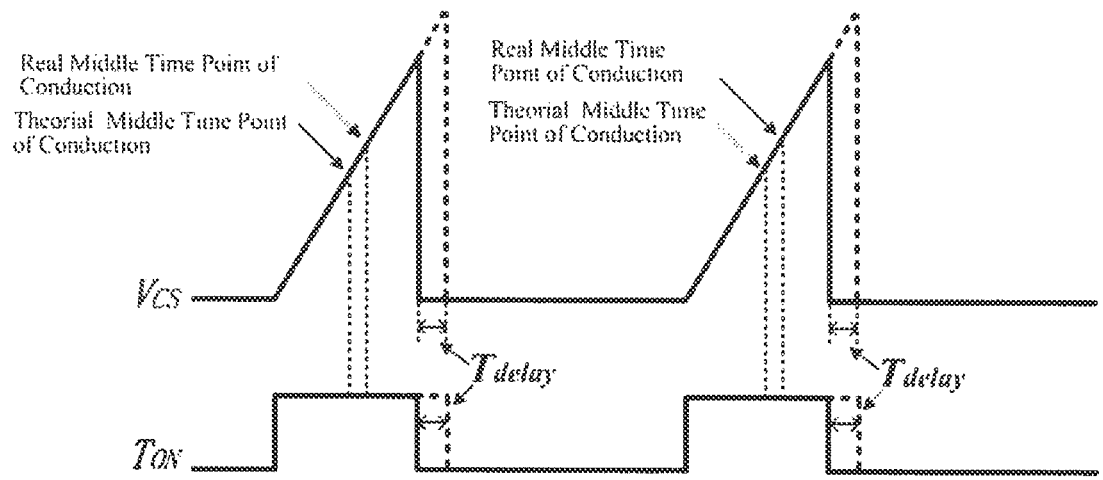
FIG. 3a shows waveforms illustrating the deviation of the sampled current of the primary side when the input voltage is relative higher.
Figure 3B:
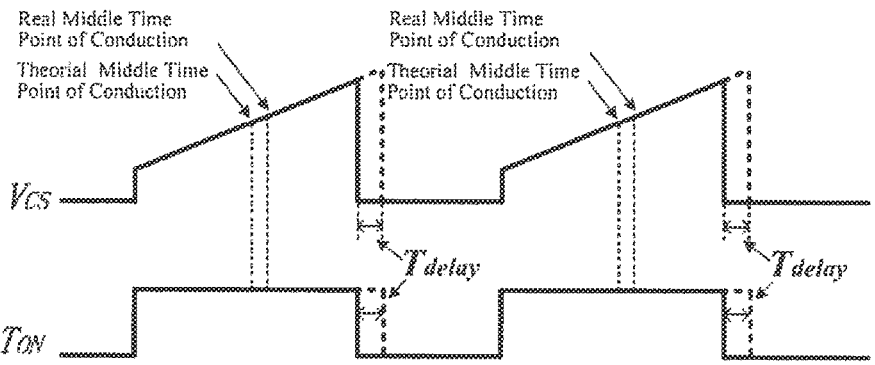
FIG. 3b shows waveforms illustrating the deviation of the sampled current of the primary side when the input voltage is relative lower.
Figure 4:
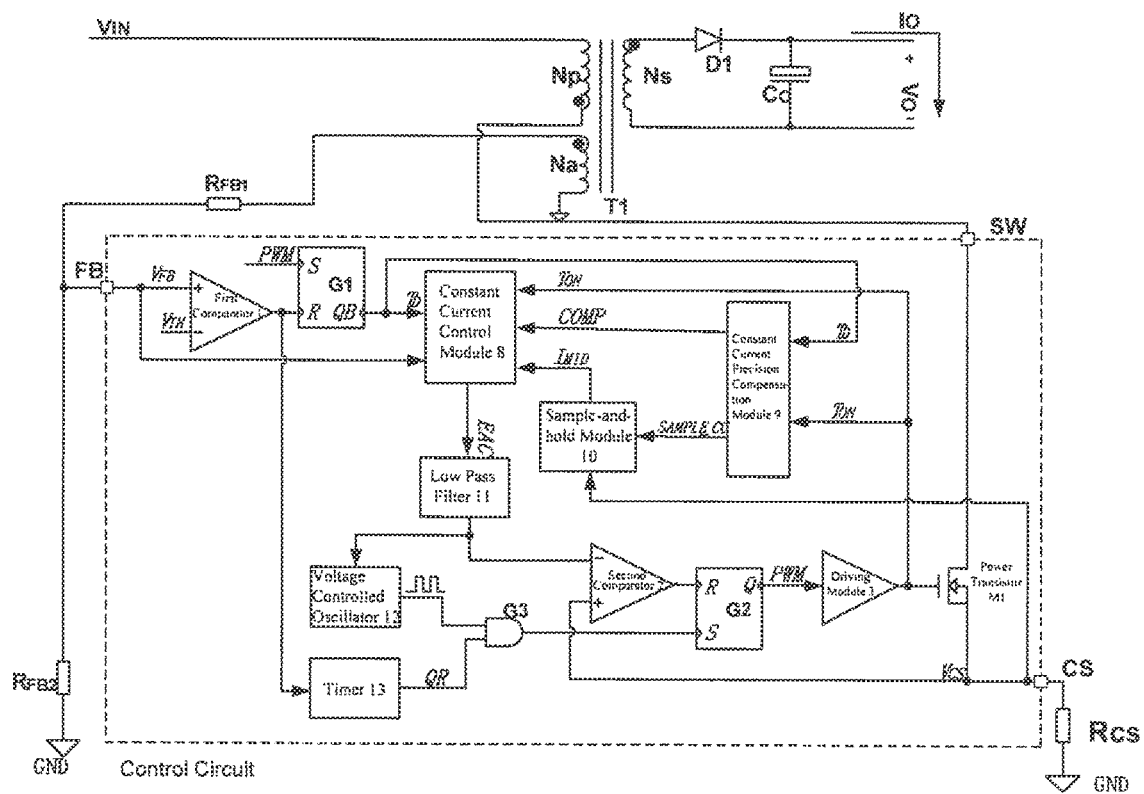
FIG. 4 is a principle schematic diagram of a control circuit and the power supply system of the switching power supply according to one embodiment of the present invention.

The control circuit and the power supply system of the switching power supply are shown in FIG. 4. The power supply system includes a transformer T1, an output diode D1, an output capacitor $C_O$, a resistor $R_{FB1}$, a resistor $R_{FB2}$, a resistor $R_{CS}$ and a control circuit. A pin FB of the control circuit is electrically connected with the resistor $R_{FB1}$ and the resistor $R_{FB2}$ respectively; a pin CS of the control circuit is electrically connected with the resistor $R_{CS}$; a pin SW of the control circuit is electrically connected with a primary side $N_p$ of the transformer.

The control circuit includes a first comparator 1, a first RS flip-latch G1, a constant current control module 8, a constant current precision compensation module 9, a sample-and-hold module 10, a low pass filter 11, a second comparator 2, a second RS flip-latch G2, a voltage controlled oscillator 12, a timer 13, an AND Gate G3, a driving module 3 and a first transistor M1. A first input end of the constant current control module 8 is electrically connected with an output end Q of the first RS flip-latch G1 and a first input end of the constant current precision compensation module 9 respectively; a second input end of the constant current control module 8 is electrically connected with the pin FB and a positive end of the first comparator 1 respectively; a third input end of the constant current control module 8 is electrically connected with an output end of the driving module 3, an input end S of the first RS flip-latch G1, a gate terminal of the first transistor M1, and a second input end of the constant current precision compensation module 9; a fourth input end of the constant current control module 8 is electrically connected with a first output end of the constant current precision compensation module 9; a fifth input end of the constant current control module 8 is electrically connected with an output end of the sample-and-hold module 10; an output end of the constant current control module 8 is electrically connected with an input end of the low pass filter 11; an input end of the sample-and-hold module 10 is electrically connected with the pin CS, a positive end of the second comparator 2, and a source terminal of the first transistor M1 respectively; a control end of the sample-and-hold module 10 is electrically connected with a second output end of the constant current precision compensation module 9; an output end of the low pass filter 11 is electrically connected with an input end of the voltage controlled oscillator 12 and a negative end of the second comparator 2. An output end of the voltage controlled oscillator 12 is electrically connected with a first input end of the AND Gate G3; an output end of the timer 13 is electrically connected with a second input end of the AND Gate G3; an input end of the timer 13 is electrically connected with an input end R of the first RS flip-latch G1 and an output end of the first comparator 1; an output end of the AND gate G3 is electrically connected with an input end S of the second RS flip-latch G2; an output end of the second comparator 2 is electrically connected with an input end R of the second RS flip-latch G2; an output end of the second RS flip-latch G2 is electrically connected with an input end of the driving module 3.

According to the feedback signals on the pin FB and the pin CS, the constant current control module 8 generates and outputs a control signal to control the output current of the switching power supply, thereby regulating the duty cycle of the first transistor M adaptively and controlling the output current Io of the power supply system to be constant. According to the feedback signals on the pin FB and the pin CS, the constant current precision compensation module 9 adaptively regulates the circuit parameters of the constant current control module 8 and the sample-and-hold module 10, preventing the precision of the constant current output from being influenced by the change of the working mode and/or by the variation of input conditions. The timer 13 judges to determine the time instant when the voltage $V_{FB}$ on the pin FB reaches the voltage valley. According to the control signal output by the constant current control module 8 and the signal output by the timer 13, the voltage controlled oscillator 12 regulates the switching frequency of the first transistor M1, making the switching power supply work in a QR mode or in a CCM, and when the output voltage changes, the QR mode keeps unchanged or depth of the current in the CCM keeps approximately constant.

Figure 5:
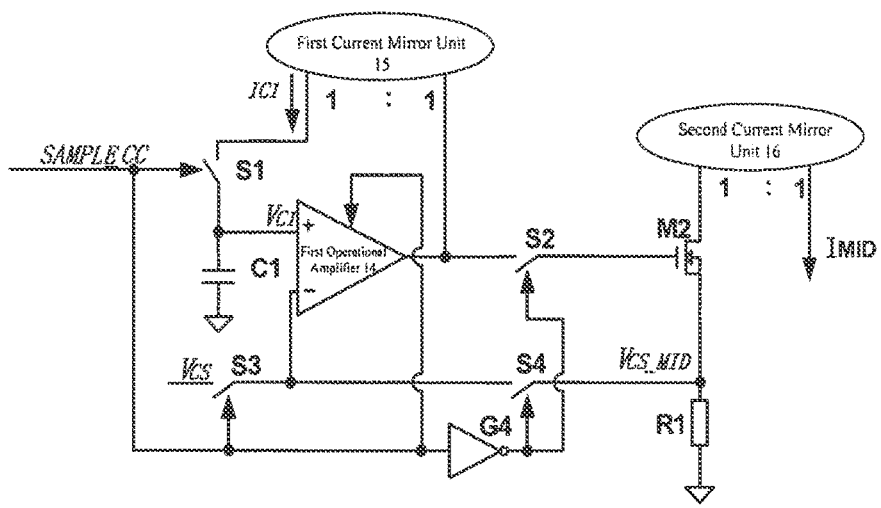
FIG. 5 is a principle schematic diagram of a sample and hold module according to one embodiment of the present invention.

As shown in FIG. 5, the sample-and-hold module 10 includes a first current mirror unit 15, a second current mirror unit 16, a first switch S1, a second switch S2, a third switch S3, a fourth switch S4, a second transistor M2, a first capacitor C1, a first resistor R1, a first operational amplifier 14, and a first inverter G4. A control end of the first switch S1 and a control end of the third switch S3 are controlled by the output signal from the second output end of the constant current precision compensation module 9; a control end of the first operational amplifier 14, the control end of the first switch S1 and the control end of the third switch S3 are electrically connected with the same signal; a control end of the second switch S2 and a control end of the fourth switch S4 are electrically connected with a first signal, which is opposite to a second signal electrically connected with the control end of the first switch S1 and a control end of the third switch S3; a positive input end of the first operational amplifier 14 is electrically connected with a first end of the first switch S1 and the first capacitor C1; a negative input end of the first operational amplifier 14 is electrically connected with a first end of the third switch S3 and a first end of the fourth switch S4; an output end of the first operational amplifier 14 is electrically connected with an output end of the first current mirror unit 15 and a first end of the second switch S2; a second end of the first switch S1 is electrically connected with an input end of the first current mirror unit 15; a second end of the second switch S2 is electrically connected with a gate terminal of the second transistor M2; a second of the third switch S3 is electrically connected with the pin CS; a second end of the fourth switch S4 is electrically connected with the first resistor R1 and a source terminal of the second transistor M2; a drain terminal of the second transistor M2 is electrically connected with an input end of the second current mirror unit 16; an output of the second current mirror unit 16 is electrically connected with the fifth input end of the constant current control module 8. The ratio of the output current of the first current mirror unit 15 to its input current is 1 to 1; the ratio of the output current of the second current mirror unit 16 to its input current is 1 to 1.

The sample-and-hold module 10 includes the first current mirror unit 15, the second current mirror unit 16, the first switch S1, the second switch S2, the third switch S3, the fourth switch S4, the second transistor M2, the first capacitor C1, the first resistor R1, the first operational amplifier 14, and the first inverter G4. When the first switch S1 and the third switch S3 are closed, the first operational amplifier 14 works in a transconductance mode, namely, the output current $I_{C1}$ from the first current mirror unit 15 charges the first capacitor C1. $I_{C1}$ is expressed as follows: $I_{C1} = K1 \times (V_{C1} - V_{CS}) \times G_M$, wherein, $V_{C1}$ is the voltage of the first capacitor C1; $V_{CS}$ is the voltage on the pin CS of the control circuit; $G_M$ is the transconductance of the first operational amplifier 14 when it works in the transconductance mode. $V_{C1}$ is expressed as follows:

$$V_{C1} = V_{CS} - \frac{C \frac{dV_{CS}}{dt}}{G_M \times K1}.$$

When $C/G_M$ approaches zero, $V_{C1} = V_{CS}$. When the first switch S1 and the third switch S3 are opened, the second switch S2 and the fourth switch S4 are closed, and the first operational amplifier 14 works in a following mode; the voltage $V_{C1}$ of the first capacitor C1 is transmitted to the source terminal of the second transistor M2, converted to a current $I_{MID}$ through the first resistor R1, mirrored and output to the fifth input end of the constant current control module 8.

Figure 6:
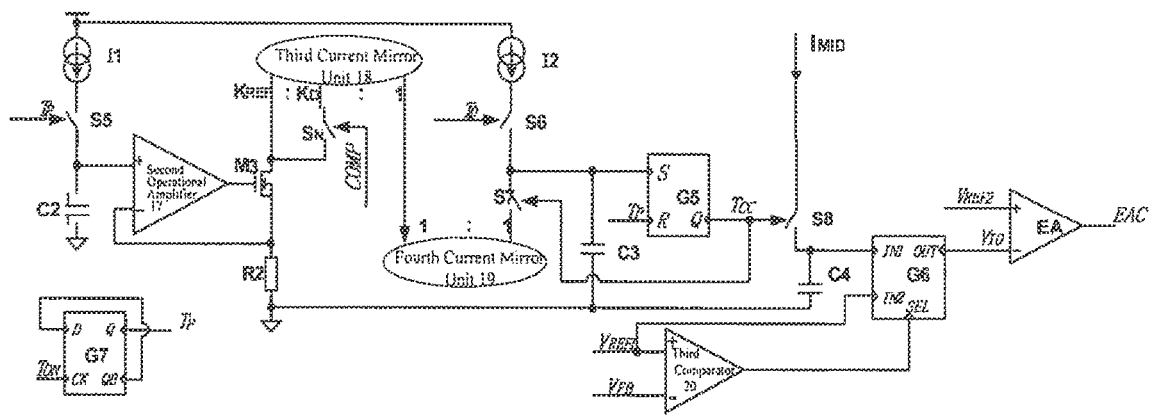
FIG. 6 is a principle schematic diagram of a constant current control module according to one embodiment of the present invention.

As shown in FIG. 6, the constant current control module 8 includes a first constant current source I1, a second constant current source I2, a current source $I_M$, a fifth switch S5, a sixth switch S6, a seventh switch S7, an eighth switch S8, a switch $S_N$, a second capacitor C2, a third capacitor C3, a fourth capacitor C4, a second resistor R2, a third transistor M3, a second operational amplifier 17, a third comparator 20, a third RS flip-latch G5, a one-of-two data selector G6, a first D flip-flop G7 and an error amplifier EA. An output end of the error amplifier EA is the output end of the constant current control module 8; a positive end of the error amplifier EA is electrically connected with a reference voltage $V_{REF2}$, a negative end of the error amplifier EA is electrically connected with an output end of the one-of-two data selector G6; an input end IN1 of the one-of-two data selector G6 is electrically connected with a first end of the eighth switch S8 and the fourth capacitor C4; an input end IN2 of the one-of-two data selector G6 is electrically connected with a positive end of third comparator 20 and a reference voltage $V_{REF1}$. A selecting end SEL of the one-of-two data selector G6 is electrically connected with an output end of the third comparator 20; a negative end of the third comparator 20 is electrically connected with the pin FB. A second end of the eighth switch S8 is electrically connected with an output end of the sample-and-hold module 10; a control end of the eighth switch S8 is electrically connected with a control end of the seventh switch S7 and the output end Q of the third RS flip-latch G5; an input end R of the third RS flip-latch G5 is electrically connected with a control end of the fifth switch S5 and an output end Q of the first D flip-flop G7; an input end S of the third RS flip-latch G5 is electrically connected with a first end of the sixth switch S6, a first end of the seventh switch S7 and the third capacitor C3; a second end of the sixth switch S6 is electrically connected with the second constant current source I2; a control end of the sixth switch S6 is electrically connected with an output end of the first comparator 1; a second end of the seventh switch S7 is electrically connected with an output end of the fourth current mirror unit 19; an input end of the fourth current mirror unit 19 is electrically connected with an output end of the third current mirror unit 18; a first input end of the third current mirror unit 18 is electrically connected with a drain terminal of the third transistor M3 and a first end of the switch $S_N$; a second input end of the third current mirror unit 18 is electrically connected with a second end of the switch $S_N$; the switch $S_N$ is controlled by a signal at a first output end of the constant current precision compensation module 9; a source terminal of the third transistor M3 is electrically connected with the second resistor R2 and an input end of the second operational amplifier 17; a gate terminal of the third transistor M3 is electrically connected with an output end of the second operational amplifier 17; a positive input end of the second operational amplifier 17 is electrically connected with a first end of the fifth switch S5 and the second capacitor C2; a second end of the fifth switch S5 is electrically connected with the first constant current source I1.

The constant current control module 8 includes the first constant current source I1, the second constant current source I2, the current source $I_M$, the fifth switch S5, the sixth switch S6, the seventh switch S7, the eighth switch S8, the switch $S_N$, the second capacitor C2, the third capacitor C3, the fourth capacitor C4, the second resistor R2, the third transistor M3, the second operational amplifier 17, the third comparator 20, the third RS flip-latch G5, the one-of-two data selector G6, the first D flip-flop G7 and the error amplifier EA. The first D flip-flop G7 is connected to form a divide-by-two circuit 115, which generates a period-by-period switching frequency signal Tp. The fifth switch S5 is controlled by the signal Tp. When the fifth switch S5 is closed, the first constant current source I1 charges the second capacitor C2; the charged voltage generates current through the second operational amplifier 17 and the second resistor R2; the current generated is mirrored and output to the fourth current mirror unit 19. The ratio of the input current to the output current of the third current mirror unit 18 is ($K_{REF}+K_D$):1, wherein, $K_{REF}$ and $K_D$ are constants, and the value of $K_D$ is controlled by the state of the switch $S_N$. The ratio of the input current to the output current of the fourth current mirror unit 19 is 1:1. The sixth switch S6 is controlled by the signal Tp. When the sixth switch S6 is closed, the second constant current source I2 charges the third capacitor C3 and the charged voltage is held after being charged. The seventh switch S7 is controlled by the output end Q of the third RS flip-latch G5; it is a high voltage level at a start of the signal $T_P$, namely, when the switching period starts, the output current of the fourth current mirror unit 19 discharges the third capacitor C3; when the voltage of the third capacitor C3 reaches the inverting threshold of the third RS flip-latch G5, the signal at the output end Q of the third RS flip-latch G5 inverts to be a low level, and the discharging process is terminated and a time signal $T_{CC}$ is generated. The eighth switch S8 is controlled by the time signal $T_{CC}$. When the eighth switch S8 is closed, the current Io charges the fourth capacitor C4, and the voltage $V_{C4}$ is transmitted to the input end IN1 of the one-of-two data selector G6. The voltage of the fourth capacitor C4 is expressed as follows:

$$V_{C4} = V_{CS\_MID} \times (K_{REF} + K_D) \times \frac{T_D}{T_P}.$$

The input end IN2 of the one-of-two data selector G6 is electrically connected with the reference voltage $V_{REF1}$, and the voltage $V_{REF1}$ is generated by an internal circuit of the control circuit. According the potential of the selecting end SEL, the one-of-two data selector G6 selects the input data at the input end IN1 or the input data at the input end IN2 as an output data. The potential of the selecting end SEL is controlled by the output signal of the third comparator 20. When the voltage $V_{FB}$ at the pin FB is less than $V_{REF1}$, the one-of-two data selector G6 selects the input data at the input end IN2 and outputs it to the negative end of the error amplifier EA, and the positive end of the error amplifier EA is electrically connected with the reference voltage $V_{REF2}$, wherein, $V_{REF2} > V_{REF1}$. At this time, the error amplifier EA outputs high voltage; the period-by-period current peak value at the primary of the transformer increases rapidly; the energy transmitted to the output stage of the power supply increases rapidly, and the switching power supply starts rapidly. When the voltage VF at the pin FB is larger than $V_{REF1}$, the selecting end SEL of the one-of-two data selector G6 selects the input data at the input end IN1, the voltage $V_{C4}$ of the fourth capacitor C4 is output to the negative end of the error amplifier EA. When the working state is in an equilibrium state, $$V_{CS\_MID} \times (K_{REF} + K_D) \times \frac{T_D}{T_P} = V_{C4} = V_{REF2}.$$

The output current Io is expressed as follows:

$$I_O = \frac{N_P}{N_S} \times \frac{V_{CS\_MID}}{R_{CS}} \times \frac{T_D}{T_P} = \frac{N_P}{N_S} \times \frac{1}{R_{CS}} \times \frac{V_{REF2}}{K_{REF} + K_D},$$

wherein, $$\frac{N_P}{N_S}$$

is the turns ratio of the primary side to the secondary side, $R_{CS}$ is the resistance of the current sensing resistor at the primary side. As for the switching power supply whose $$\frac{N_P}{N_S}$$

and $R_{CS}$ are determined, the output current Io is a constant.

The current values of the first constant current source I1 and the second constant current source I2 are equal; the resistance values of the second resistor R2 and the first resistor R1 are equal; the capacitance values of the second capacitor C2, the third capacitor C3 and the fourth capacitor C4 are equal.

Figure 7:
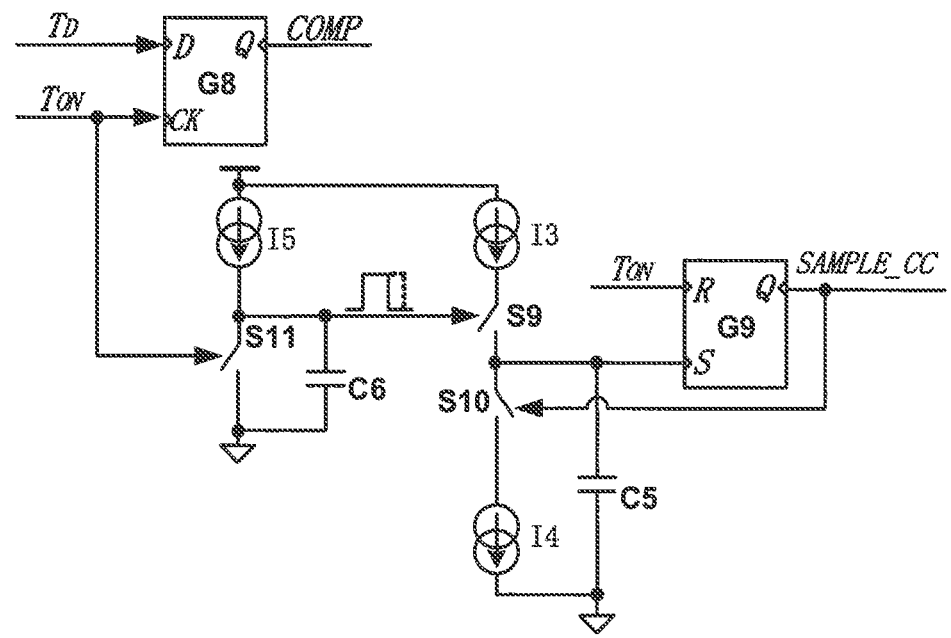
FIG. 7 is a principle schematic diagram of a constant current precision compensation module according to one embodiment of the present invention.

As shown in FIG. 7, the constant current precision compensation module 9 includes a second D flip-flop G8, a fourth RS flip-latch G9, a third constant current source I3, a fourth constant current source I4, a fifth constant current source I5, a ninth switch S9, a tenth switch S10, an eleventh switch S11, a fifth capacitor C5 and a sixth capacitor C6. An input end D of the second D flip-flop G8 is electrically connected with the output end of the first comparator 1; an output end Q of the second D flip-flop G8 is electrically connected with the constant current control module 8; an input end CK of the second D flip-flop G8 is electrically connected with a control end of the eleventh switch S11, an input end R of the fourth RS flip-latch G9 and the output end of the driving module 3; a control end of the ninth switch S9 is electrically connected with a first end of the eleventh switch S11, the fifth constant current source I5, and a first end of the sixth capacitor C6; a first end of the ninth switch S9 is electrically connected with the third constant current source I3; a second end of the ninth switch S9 is electrically connected with a first end of the tenth switch S10, an input end S of the fourth RS flip-latch G9 and a first end of the fifth capacitor C5; a second end of the tenth switch S10 is electrically connected with the fourth constant current source I4; an output end Q of the fourth RS flip-latch G9 is electrically connected with the sample-and-hold module 10; a second end of the eleventh switch S11, a second end of the fifth capacitor C5 and a second end of the sixth capacitor C6 are electrically connected with the power ground.

The constant current precision compensation module 9 includes the second D flip-flop G8, the fourth RS flip-latch G9, the third constant current source I3, the fourth constant current source I4, the fifth constant current source I5, the ninth switch S9, the tenth switch S10, the eleventh switch S11, the fifth capacitor C5 and the sixth capacitor C6. At the start time instant that the first transistor M1 is on, the second D flip-flop G8 detects whether the voltage $V_{FB}$ at the pin FB is lower than a voltage threshold $V_{TH}$, namely, whether the demagnetization of the transformer is finished; if yes, a mode compensation signal COMP is output to the constant current control module 8, thereby regulating the scaling parameter $K_D$, and differences of output currents between different working modes are compensated. A delay circuit for falling edge including the fifth constant current source I5, the eleventh switch S11 and the sixth capacitor C6 is configured to calculate and adjust the time point of the sampling instants of voltage $V_{CS}$, based on adjusting the pulse width used, thereby regulating the distance between the sampling instant of the voltage $V_{CS}$ and the midpoint of a real conduction period of the first transistor M1, and compensating differences of output currents under different input voltages.

Figure 8:
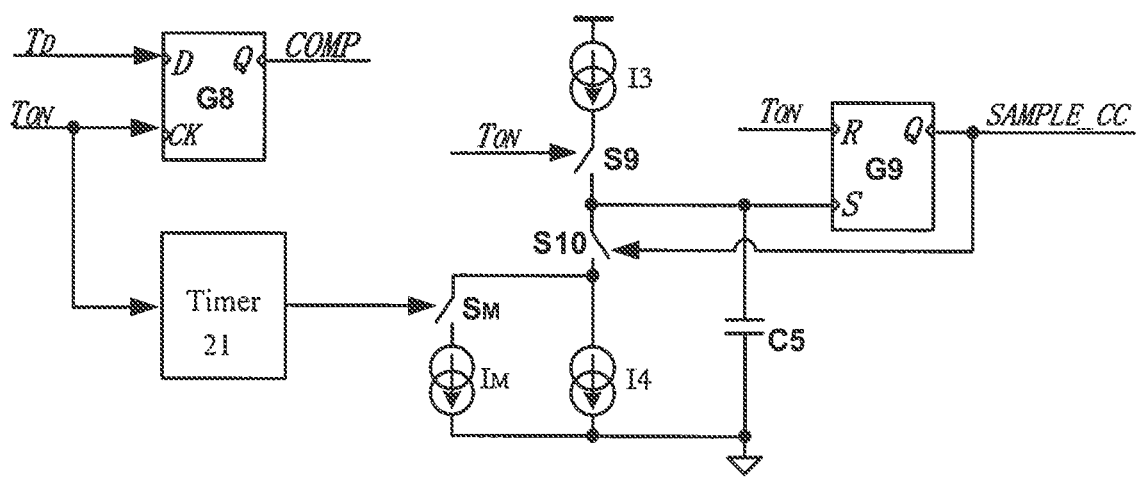
FIG. 8 is a principle schematic diagram of a constant current precision compensation module according to another embodiment of the present invention.

As shown in FIG. 8, the constant current precision compensation module 9 includes the second D flip-flop G8, the fourth RS flip-latch G9, the timer 21, the third constant current source I3, the fourth constant current source I4, the ninth switch S9, the tenth switch S10, the switch SM, the fifth capacitor C5 and the sixth capacitor C6. The input end D of the second D flip-flop G8 is electrically connected with the output end of the first comparator 1; the input end CK of the second D flip-flop G8 is electrically connected with the control end of the ninth switch S9, the input end R of the fourth RS flip-latch G9, the input end of a timer 21 and the output end of the driving module 3; the output end Q of the second D flip-flop G8 is electrically connected with the constant current control module 8; the first end of the ninth switch S9 is electrically connected with the third constant current source I3; the second end of the ninth switch S9 is electrically connected with the first end of the tenth switch S10, the fifth capacitor C5, and the input end S of the fourth RS flip-latch G9; the second end of the tenth switch S10 is electrically connected with the fourth constant current source I4 and the first end of the switch $S_M$; the second end of the switch $S_M$ is electrically connected with the current source $I_M$; the input end of the switch $S_M$ is electrically connected with the output end of the timer 21.

Figure 9A:
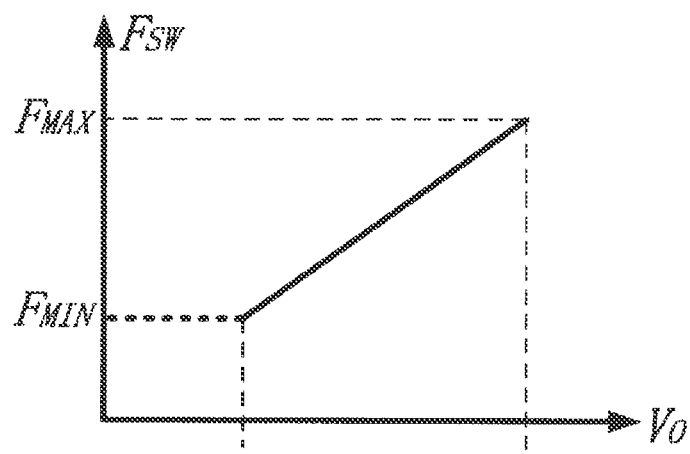
FIG. 9a is a waveform illustrating the switching frequency of the control circuit of switching power supply according to one embodiment of the present invention.
Figure 9B:
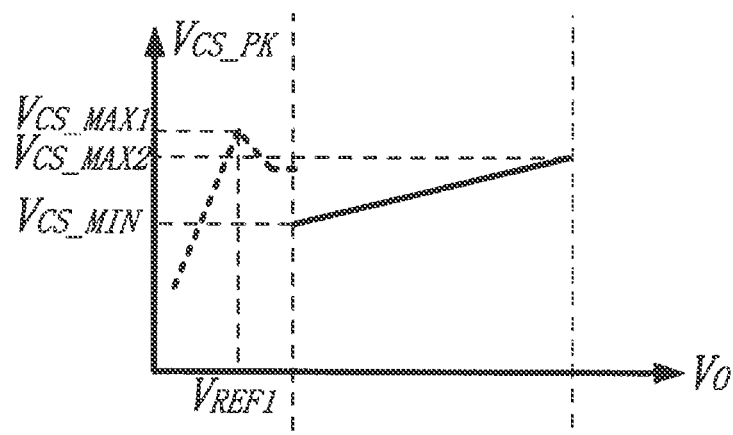
FIG. 9b is a waveform illustrating the voltage peak value of the primary side current sense resistor of the switching power supply according to one embodiment of the present invention.
Figure 9C:
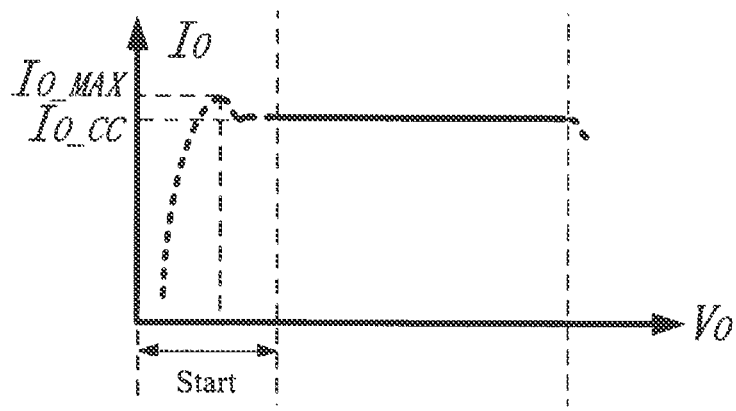
FIG. 9c is a waveform illustrating the output current of the switching power supply according to one embodiment of the present invention.

FIGS. 9a, 9b and 9c show a group of wave forms of the control circuit of the switching power supply according to one embodiment of the present invention. The voltage VF on the pin FB of the control circuit is proportional to the output voltage Vo. At the starting stage, when the voltage $V_{FB}$ is less than the reference voltage $V_{REF1}$, the switching frequency $F_{SW}$ keeps constant, and the output signal EAC of the constant current control module 8 regulates the voltage peak $V_{CS\_PK}$ of the resistor $R_{CS}$ at the primary side of the transformer to rise rapidly. The energy transmitted period by period by the switching power supply to the capacitor Co at the secondary side of the transformer increases rapidly; the output voltage Vo rises rapidly and the power supply starts rapidly. When the voltage $V_{FB}$ is greater than the reference voltage $V_{REF1}$, the voltage $V_{CS\_PK}$ reaches the maximum $V_{CS\_MAX1}$, and the output current reaches the maximum $I_{O\_MAX}$. The constant current control module 8 starts to regulate the voltage $V_{CS\_PK}$ accordingly, making the voltage $V_{CS\_PK}$ approach a stable value gradually. The stable value of the voltage $V_{CS\_PK}$ is related with the output voltage Vo in a normal working state. In a normal working state, the voltage controlled oscillator 12 regulates the switching frequency Fsw according to the output signal of the constant current control module 8, and the regulating range is from $F_{MIN}$ to $F_{MAX}$. Simultaneously, according to the input and output conditions of the switching power supply, the output signal of the constant current control module 8 regulates the value $V_{CS\_PK}$, and the regulating range is from $V_{CS\_MIN}$ to $V_{CS\_MAX2}$, and the output current Io is a constant $I_{O\_CC}$. Under the condition that the input and output conditions are not beyond the range of the normal working, the output current Io remains constant.

The switching power supply according to one embodiment of the present invention outputs constant current in the continuous working mode and/or in the quasi-resonant working mode, and doesn't increase the cost of the control circuit and the elements of the power system and the design cost thereof. The present invention regulates the scaling parameters of the constant current control circuit through detecting the working mode and/or the resonant period, so as to compensate the difference of the constant currents output between different working modes. Through detecting the off delay of the power switch and the static error of the current sampled at the primary side, regulate the sampling point of the current at the primary side, so as to compensate the difference of the constant currents output under different input voltages. Through detecting the off delay of the power switch and the static error of the sampled current at the primary side, the present invention regulates the sampling point of the current at the primary side, so as to compensate the difference of the constant currents output under different input voltages; the constant current output according to one embodiment of the present invention has a high precision.

Additionally, at the initial stage of starting, shield the detected date of the primary side, set separated starting parameters, thereby charging the output capacitor rapidly, establishing the output voltage more quickly and starting the switching power supply more quickly. Based on the control and the compensation above, the precision of the constant current output is enhanced and the switching power supply starts more quickly, especially, enhancing the starting speed of capacitive loads.

At the initial stage of starting, the control circuit of the switching power supply according to one embodiment of the present invention shields the detected date of the primary side, sets separated starting parameters, thereby charging the output capacitor rapidly, establishing the output voltage more quickly and enhancing the starting speed, especially, enhancing the starting speed of capacitive loads. Based on the $V_{FB}$ value, the switching frequency is regulated accordingly, namely, switching frequency is regulated according to the loads when the switching power outputs constant current, to ensure that the switching power supply works in the quasi-resonant mode and/or in the continuous working mode. What's more, the depth of the continuous working mode doesn't change along with the change of the loads, thereby ensuring that the switch has high transfer efficiency and has no risk of saturation and being damaged.

The design of the power system is simple, and it has low cost and is started-up more quickly. The capacitive loads start reliably and the constant current output has high precision.

It will be understood by those skilled in the art that the preferred embodiments described above are not restricted and that various modifications and improvements may be made based on the principles of the present disclosure without departing from the scope of the disclosure.

What is claimed is:

1. A control circuit of a switching power supply, comprising:
   a first comparator, a first RS flip-latch, a constant current control module, a constant current precision compensation module, a sample-and-hold module, a low pass filter, a second comparator, a second RS flip-latch, a voltage controlled oscillator, a timer, an AND Gate, a driving module and a first transistor;
   wherein, a first input end of the constant current control module is electrically connected with an output end Q of the first RS flip-latch and a first input end of the constant current precision compensation module respectively;

a second input end of the constant current control module is electrically connected with a pin FB and a positive end of the first comparator respectively;

a third input end of the constant current control module is electrically connected with an output end of the driving module, an input end S of the first RS flip-latch, a gate terminal of the first transistor, and a second input end of the constant current precision compensation module;

a fourth input end of the constant current control module is electrically connected with a first output end of the constant current precision compensation module;

a fifth input end of the constant current control module is electrically connected with an output end of the sample-and-hold module; an output end of the constant current control module is electrically connected with an input end of the low pass filter; an input end of the sample-and-hold module is electrically connected with a pin CS, a positive end of the second comparator, and a source terminal of the first transistor respectively; a control end of the sample-and-hold module is electrically connected with a second output end of the constant current precision compensation module; an output end of the low pass filter is electrically connected with an input end of the voltage controlled oscillator and a negative end of the second comparator; an output end of the voltage controlled oscillator is electrically connected with a first input end of the AND Gate; an output end of the timer is electrically connected with a second input end of the AND Gate; an input end of the timer is electrically connected with an input end R of the first RS flip-latch and an output end of the first comparator; an output end of the AND gate is electrically connected with an input end S of the second RS flip-latch; an output end of the second comparator is electrically connected with an input end R of the second RS flip-latch; an output end of the second RS flip-latch is electrically connected with an input end of the driving module.

2. The control circuit of the switching power supply according to claim 1, wherein, the sample-and-hold module comprises a first current mirror unit, a second current mirror unit, a first switch, a second switch, a third switch, a fourth switch, a second transistor, a first capacitor, a first resistor, a first operational amplifier, and a first inverter;

a control end of the first switch and a control end of the third switch are controlled by an output signal from the second output end of the constant current precision compensation module; a control end of the first operational amplifier, a control end of the first switch and the control end of the third switch are electrically connected with a same signal; a control end of the second switch and a control end of the fourth switch are electrically connected with a first signal, which is opposite to a second signal electrically connected with the control end of the first switch and the control end of the third switch; a positive input end of the first operational amplifier is electrically connected with the first capacitor and a first end of the first switch; a negative input end of the first operational amplifier is electrically connected with a first end of the third switch and a first end of the fourth switch; an output end of the first operational amplifier is electrically connected with an output end of the first current mirror unit and a first end of the second switch; a second end of the first switch is electrically connected with an input end of the first current mirror unit; a second end of the second switch is electrically connected with a gate terminal of the second transistor; a second end of the third switch is electrically connected with the pin CS; a second end of the fourth switch is electrically connected with the first resistor and a source terminal of the second transistor; a drain terminal of the second transistor is electrically connected with an input end of the second current mirror unit; an output of the second current mirror unit is electrically connected with the fifth input end of the constant current control module.

3. The control circuit of the switching power supply according to claim 1, wherein, the constant current control module comprises a first constant current source, a second constant current source, a current source, a fifth switch, a sixth switch, a seventh switch, an eighth switch, a switch $S_N$, a second capacitor, a third capacitor, a fourth capacitor, a second resistor, a third transistor, a second operational amplifier, a third comparator, a third RS flip-latch, a one-of-two data selector, a first D flip-flop and an error amplifier;

an output end of the error amplifier is the output end of the constant current control module; a positive end of the error amplifier is electrically connected with a reference voltage $V_{REF2}$, a negative end of the error amplifier is electrically connected with an output end of the one-of-two data selector; an input end IN1 of the one-of-two data selector is electrically connected with the fourth capacitor and a first end of the eighth switch; an input end IN2 of the one-of-two data selector is electrically connected with a positive end of the third comparator and a reference voltage $V_{REF1}$, a selecting end SEL of the one-of-two data selector is electrically connected with an output end of the third comparator; a negative end of the third comparator is electrically connected with the pin FB; a second end of the eighth switch is electrically connected with an output end of the sample-and-hold module; a control end of the eighth switch is electrically connected with a control end of the seventh switch and an output end Q of the third RS flip-latch; an input end R of the third RS flip-latch is electrically connected with a control end of the fifth switch and an output end Q of the first D flip-flop; an input end S of the third RS flip-latch is electrically connected with the third capacitor, a first end of the sixth switch and a first end of the seventh switch; a second end of the sixth switch is electrically connected with the second constant current source; a control end of the sixth switch is electrically connected with an output end of the first comparator; a second end of the seventh switch is electrically connected with an output end of the fourth current mirror unit; an input end of the fourth current mirror unit is electrically connected with an output end of the third current mirror unit; a first input end of the third current mirror unit is electrically connected with a drain terminal of the third transistor and a first end of the switch $S_N$, a second input end of the third current mirror unit is electrically connected with a second end of the switch $S_N$, the switch $S_N$ is controlled by a signal at a first output end of the constant current precision compensation module;

a source terminal of the third transistor is electrically connected with the second resistor and an input end of the second operational amplifier; a gate terminal of the third transistor is electrically connected with an output end of the second operational amplifier; a positive input end of the second operational amplifier is electrically connected with the second capacitor and a first end of the fifth switch; a second end of the fifth switch is electrically connected with the first constant current source.

4. The control circuit of the switching power supply according to claim 1, wherein, the constant current precision compensation module comprises a second D flip-flop, a fourth RS flip-latch, a third constant current source, a fourth constant current source, a fifth constant current source, a ninth switch, a tenth switch, an eleventh switch, a fifth capacitor and a sixth capacitor;

an input end D of the second D flip-flop is electrically connected with the output end of the first comparator; an output end Q of the second D flip-flop is electrically connected with the constant current control module; an input end CK of the second D flip-flop is electrically connected with a control end of the eleventh switch, an input end R of the fourth RS flip-latch and the output end of the driving module; a control end of the ninth switch is electrically connected with a first end of the eleventh switch, the fifth constant current source, and a first end of the sixth capacitor; a first end of the ninth switch is electrically connected with the third constant current source; a second end of the ninth switch is electrically connected with a first end of the tenth switch, an input end S of the fourth RS flip-latch and a first end of the fifth capacitor; a second end of the tenth switch is electrically connected with the fourth constant current source; an output end Q of the fourth RS flip-latch is electrically connected with the sample-and-hold module; a second end of the eleventh switch, a second end of the fifth capacitor and a second end of the sixth capacitor are electrically connected with the power ground.

5. The control circuit of the switching power supply according to claim 1, wherein, the constant current precision compensation module comprises a second D flip-flop, a fourth RS flip-latch, a timer, a third constant current source, a fourth constant current source, a ninth switch, a tenth switch, a switch $S_M$, a fifth capacitor and a sixth capacitor;

an input end D of the second D flip-flop is electrically connected with the output end of the first comparator; an input end CK of the second D flip-flop is electrically connected with a control end of the ninth switch, an input end R of the fourth RS flip-latch, an input end of the timer and the output end of the driving module; an output end Q of the second D flip-flop is electrically connected with the constant current control module; a first end of the ninth switch is electrically connected with the third constant current source; a second end of the ninth switch is electrically connected with a first end of the tenth switch, the fifth capacitor, and an input end S of the fourth RS flip-latch; a second end of the tenth switch is electrically connected with the fourth constant current source and a first end of the switch $S_M$; a second end of the switch $S_M$ is electrically connected with the current source $I_M$; an input end of the switch $S_M$ is electrically connected with an output end of the timer.

6. A control method of a switching power supply, said control method implemented with the control circuit according to claim 1; wherein, according to feedback signals on the pin FB and the pin CS, the constant current control module generates and outputs a control signal to control an output current of the switching power supply, thereby regulating the duty cycle of the first transistor adaptively and controlling an output current Io of the power supply system to be constant; according to feedback signals on the pin FB and on the pin CS, the constant current precision compensation module adaptively regulates circuit parameters of the constant current control module and the sample-and-hold module, preventing a precision of the constant current output from being influenced by change of a working mode and/or by variation of input conditions; the timer is configured to judge to determine an time instant when the voltage $V_{FB}$ on the pin FB reaches the voltage valley; according to a control signal output by the constant current control module and a signal output by the timer, the voltage controlled oscillator regulates the switching frequency of the first transistor, making the switching power supply work in a QR mode or in a CCM, and when an output voltage changes, the QR mode keeps unchanged or depth of the CCM keeps approximately constant.

7. The control method of the switching power supply according to claim 6, wherein, the sample-and-hold module comprises a first current mirror unit, a second current mirror unit, a first switch, a second switch, a third switch, a fourth switch, a second transistor, a first capacitor, a first resistor, a first operational amplifier, and a first inverter;

when the first switch and the third switch are closed, the first operational amplifier works in a transconductance mode, namely, an output current $I_{C1}$ from the first current mirror unit charges the first capacitor; $I_{C1}$ is expressed as follows: $I_{C1}=K1\times(V_{C1}-V_{CS})\times G_M$, wherein, $V_{C1}$ is the voltage of the first capacitor; $V_{CS}$ is the voltage on the pin CS of the control circuit; $G_M$ is the transconductance of the first operational amplifier when it works in the transconductance mode; $V_{C1}$ is expressed as follows:

$$V_{C1} = V_{CS} - \frac{C\frac{dV_{CS}}{dt}}{G_M \times K1};$$

when $C/G_M$ approaches zero, $V_{C1}=V_{CS}$ is obtained; when the first switch and the third switch are opened, the second switch and the fourth switch are closed, and the first operational amplifier works in a following mode; the voltage $V_{C1}$ of the first capacitor is transmitted to a source terminal of the second transistor, converted to a current $I_{MID}$ through the first resistor, mirrored and output to the fifth input end of the constant current control module.

8. The control method of the switching power supply according to claim 6, wherein, the constant current control module comprises a first constant current source, a second constant current source, a current source $I_M$, a fifth switch, a sixth switch, a seventh switch, an eighth switch, a switch $S_N$, a second capacitor, a third capacitor, a fourth capacitor, a second resistor, a third transistor, a second operational amplifier, a third comparator, a third RS flip-latch, a one-of-two data selector, a first D flip-flop and an error amplifier;

the first D flip-flop is connected to form a divide-by-two circuit, which generates a period-by-period switching frequency signal $T_P$; a fifth switch is controlled by a signal $T_P$; when the fifth switch is closed, the first constant current source charges the second capacitor;

the charged voltage generates current through the second operational amplifier and the second resistor; the current generated is mirrored and output to a fourth current mirror unit; a ratio of an input current to an output current of a third current mirror unit is ($K_{REF}$+ $K_D$):1, wherein, $K_{REF}$ and $K_D$ are constants, and a value of $K_D$ is controlled by a state of the switch $S_N$; a ratio of an input current to the output current of the fourth current mirror unit is 1:1; the sixth switch is controlled by the signal $T_P$; when the sixth switch is closed, the second constant current source charges the third capacitor and the charged voltage is held after being charged; the seventh switch is controlled by an output end Q of the third RS flip-latch; it is a high voltage level at a start of the signal $T_P$, namely, when a switching period starts, the output current of the fourth current mirror unit discharges the third capacitor; when the voltage of the third capacitor reaches an inverting threshold of the third RS flip-latch, the signal at the output end Q of the third RS flip-latch inverts to be a low level, and the discharging process is terminated and a time signal $T_{CC}$ is generated; the eighth switch is controlled by a time signal $T_{CC}$; when the eighth switch is closed, a current $I_{MID}$ charges the fourth capacitor, and a voltage $V_{C4}$ is transmitted to an input end IN1 of the one-of-two data selector; the voltage $V_{C4}$ of the fourth capacitor is expressed as follows:

$$V_{C4} = V_{CS\_MID} \times (K_{REF} + K_D) \times \frac{T_D}{T_P};$$

the input end IN2 of the one-of-two data selector is electrically connected with a reference voltage $V_{REF1}$, and a voltage $V_{REF1}$ is generated by an internal circuit of the control circuit; the one-of-two data selector selects an input data at the input end IN1 or an input data at the input end IN2 as an output data at a selecting end SEL, a potential of the selecting end SEL is controlled by an output signal of the third comparator; when the voltage $V_{FB}$ at the pin FB is less than $V_{REF1}$, the selecting end SEL of the one-of-two data selector selects the input data at the input end IN2 and outputs it to a negative end of the error amplifier, and a positive end of the error amplifier is electrically connected with the reference voltage $V_{REF2}$, wherein, $V_{REF2}$>$V_{REF1}$; at this time, the error amplifier outputs a high voltage; a period-by-period current peak value at a primary side of a transformer increases rapidly; energy transmitted to an output stage of the power supply increases rapidly, and the switching power supply starts rapidly; when the voltage $V_{FB}$ at the pin FB is larger than $V_{REF1}$, the selecting end SEL of the one-of-two data selector selects the input data at the input end IN1, the voltage $V_{C4}$ of the fourth capacitor is output to the negative end of the error amplifier; when the working state is in an equilibrium state, $$V_{CS\_MID} \times (K_{REF} + K_D) \times \frac{T_D}{T_P} = V_{C4} = V_{REF2};$$

an output current Io is expressed as follows:

$$I_O = \frac{N_P}{N_S} \times \frac{V_{CS\_MID}}{R_{CS}} \times \frac{T_D}{T_P} = \frac{N_P}{N_S} \times \frac{1}{R_{CS}} \times \frac{V_{REF2}}{K_{REF} + K_D},$$

wherein, $$\frac{N_P}{N_S}$$

is a turns ratio of the primary side to a secondary side, $R_{CS}$ is a resistance of a current sensing resistor at the primary side; as for the switching power supply whose $$\frac{N_P}{N_S}$$

and $R_{CS}$ are determined, the output current Io is a constant.

9. The control method of the switching power supply according to claim 8, wherein, current values of the first constant current source and the second constant current source are equal; capacitance values of the second capacitor, the third capacitor and the fourth capacitor are equal.

10. The control method of the switching power supply according to claim 6, wherein, a constant current precision compensation module comprises a second D flip-flop, a fourth RS flip-latch, a third constant current source, a fourth constant current source, a fifth constant current source, a ninth switch, a tenth switch, an eleventh switch, a fifth capacitor and a sixth capacitor;

at a start time instant when the first transistor is on, the second D flip-flop detects whether the voltage $V_{FB}$ at the pin FB is lower than a voltage threshold $V_{TH}$, namely, whether a demagnetization of the transformer is finished or not; if yes, a mode compensation signal COMP is output to the constant current control module, thereby regulating a scaling parameter $K_D$, and differences of output currents between different working modes are compensated; a delay circuit for falling edge comprising the fifth constant current source, the eleventh switch and the sixth capacitor is configured to calculate and adjust the time point of the sampling instants of voltage $V_{CS}$, based on adjusting the pulse width used, thereby regulating a distance between the sampling instant of the voltage $V_{CS}$ and a midpoint of a real conduction period of the first transistor, and compensating differences of output currents under different input voltages.

* * * * *